US012233480B2

(12) United States Patent
Hagiwara et al.

(10) Patent No.: US 12,233,480 B2
(45) Date of Patent: Feb. 25, 2025

(54) INFORMATION PROCESSING DEVICE, LASER PROCESSING MACHINE, JUDGMENT METHOD, AND RECORDING MEDIUM

(71) Applicant: Mitsubishi Electric Corporation, Tokyo (JP)

(72) Inventors: Toshiyuki Hagiwara, Tokyo (JP); Eisuke Yonezawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 686 days.

(21) Appl. No.: 17/522,039

(22) Filed: Nov. 9, 2021

(65) Prior Publication Data

US 2022/0063023 A1  Mar. 3, 2022

Related U.S. Application Data

(63) Continuation of application No. PCT/JP2019/019206, filed on May 15, 2019.

(51) Int. Cl.
*B23K 26/38* (2014.01)
*B23K 37/04* (2006.01)
*G05B 19/4155* (2006.01)

(52) U.S. Cl.
CPC .............. *B23K 26/38* (2013.01); *B23K 37/04* (2013.01); *G05B 19/4155* (2013.01); *G05B 2219/36199* (2013.01)

(58) Field of Classification Search
CPC ...... B23K 26/38; B23K 37/04; B23K 26/702; B23K 26/02; G05B 19/4155; G05B 2219/36199
See application file for complete search history.

(56) References Cited

U.S. PATENT DOCUMENTS

| 8,455,787 B2* | 6/2013 | Takada ................... B23K 26/38 |
| | | 219/121.6 |
| 2010/0193479 A1* | 8/2010 | Takada ................... B23K 26/38 |
| | | 219/121.6 |

(Continued)

FOREIGN PATENT DOCUMENTS

| DE | 10 2018 126 077 A1 | 4/2020 |
| JP | 9-271977 A | 10/1997 |

(Continued)

OTHER PUBLICATIONS

German Office Action for German Application No. 112019007215.3, dated Aug. 18, 2022, with English translation.

*Primary Examiner* — Zhipeng Wang
(74) *Attorney, Agent, or Firm* — Birch, Stewart, Kolasch & Birch, LLP

(57) ABSTRACT

An information processing device includes a support extraction unit that extracts a support supporting an object corresponding to a cutout region at an outermost position among one or more supports supporting the object based on cutout region information indicating the cutout region as a region to be cut out by a laser processing machine and support information indicating the one or more supports supporting the object corresponding to the cutout region and a judgment unit that judges whether the object will incline and rise by being supported by the one or more supports or not based on a support count as the number of supports supporting the object at outermost positions.

11 Claims, 13 Drawing Sheets

(56) References Cited

U.S. PATENT DOCUMENTS

| | | |
|---|---|---|
| 2012/0109352 A1 | 5/2012 | Himeno et al. |
| 2019/0247961 A1* | 8/2019 | Ottnad ................... B23K 26/16 |
| 2021/0229308 A1 | 7/2021 | Ottnad et al. |

FOREIGN PATENT DOCUMENTS

| | | |
|---|---|---|
| JP | 2011-18205 A | 1/2011 |
| JP | 2013-180314 A | 9/2013 |
| JP | 2015-44231 A | 3/2015 |
| WO | WO 2009/005145 A1 | 1/2009 |
| WO | WO 2015/104071 A1 | 7/2015 |
| WO | WO 2018/077763 A2 | 5/2018 |

* cited by examiner

INFORMATION PROCESSING DEVICE, LASER PROCESSING MACHINE, JUDGMENT METHOD, AND RECORDING MEDIUM

CROSS-REFERENCE TO RELATED APPLICATION

This application is a continuation application of International Application No. PCT/JP2019/019206 having an international filing date of May 15, 2019, the disclosure of which is incorporated herein by reference in its entirety.

BACKGROUND OF THE INVENTION

1. Field of the Invention

The present disclosure relates to an information processing device, a laser processing machine, a judgment method and a recording medium storing a judgment program.

2. Description of the Related Art

Laser processing machines are widely known. The laser processing machine is an apparatus that irradiates a work supported by supports with a laser beam. There are cases where a component that has been cut out by the laser beam inclines and rises between/among a plurality of supports. Due to the rising of the component, a head outputting the laser beam and the component collide with each other. To deal with this problem, there is a method in which a device simulates whether a component rises or not before the processing is performed. Then, based on the result of the simulation, the head moves through a path to avoid the place where the component rises. Accordingly, the collision of the head and the component can be avoided.

Here, a technology regarding the simulation has been proposed (see Patent Reference 1: WO 2018/077763).

Incidentally, there are cases where a plurality of supports aligned in a straight line are set as a rotation axis. Then, it is possible to consider a method of making a judgment on the rising of an object such as a component based on the setting. However, with this method, the accuracy of the rising judgment is low since the judgment is made by setting a plurality of supports aligned in a straight line as the rotation axis.

SUMMARY OF THE INVENTION

An object of the present disclosure is to increase the accuracy of the rising judgment.

An information processing device according to an aspect of the present disclosure is provided. The information processing device includes: a support extraction unit that extracts a support supporting an object corresponding to a cutout region at an outermost position among one or more supports supporting the object based on cutout region information indicating the cutout region as a region to be cut out by a laser processing machine and support information indicating the one or more supports supporting the object corresponding to the cutout region; and a judgment unit that judges whether the object will incline and rise by being supported by the one or more supports or not based on a support count as the number of supports supporting the object at outermost positions.

According to the present disclosure, the accuracy of the rising judgment can be increased.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein.

DETAILED DESCRIPTION OF THE INVENTION

Embodiments will be described below with reference to the drawings. The following embodiments are just examples and a variety of modifications are possible within the scope of the present disclosure.

First Embodiment

Figure 1:
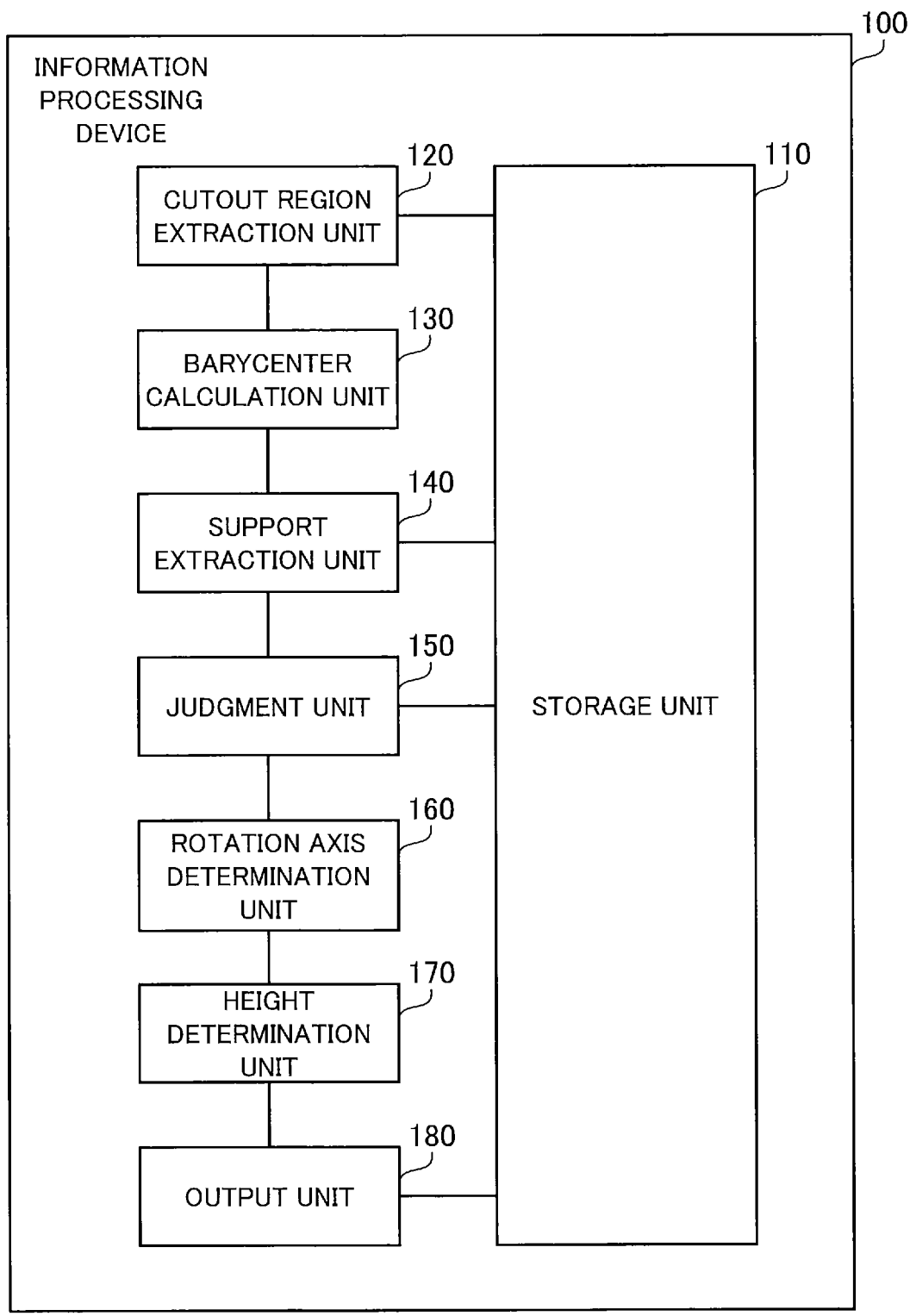
FIG. 1 is a functional block diagram showing a configuration of an information processing device in a first embodiment.

FIG. 1 is a functional block diagram showing the configuration of an information processing device in a first embodiment. The information processing device 100 is a device that simulates whether an object rises or not. Further, the information processing device 100 is a device that executes a judgment method.

Here, hardware included in the information processing device 100 will be described.

Figure 2:
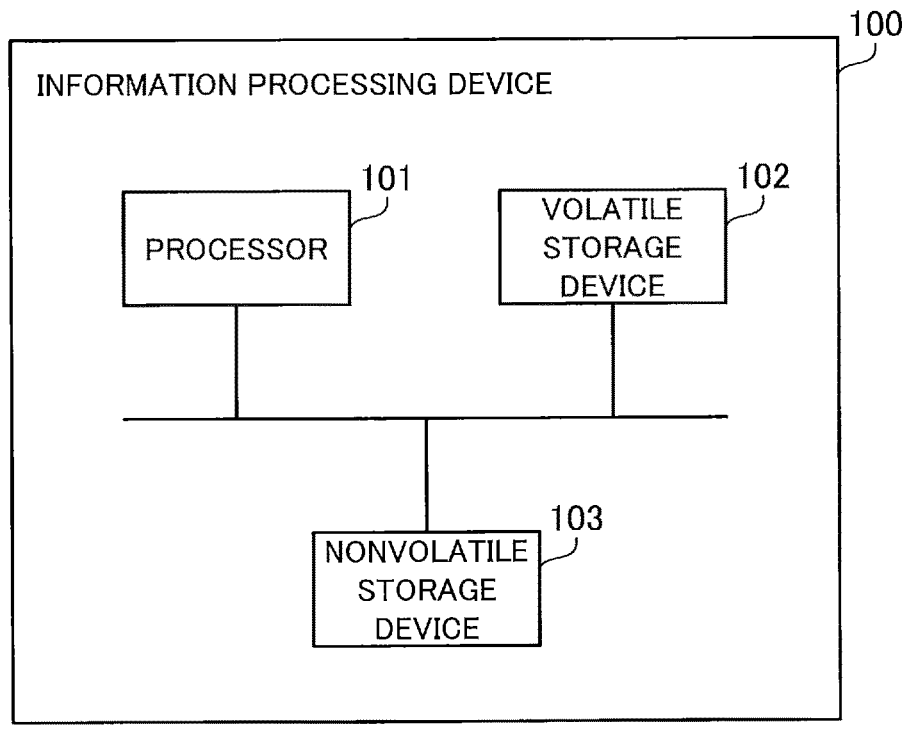
FIG. 2 is a diagram showing a configuration of hardware included in the information processing device in the first embodiment.

FIG. 2 is a diagram showing the configuration of the hardware included in the information processing device in the first embodiment. The information processing device 100 includes a processor 101, a volatile storage device 102 and a nonvolatile storage device 103.

The processor 101 controls the whole of the information processing device 100. For example, the processor 101 is a Central Processing Unit (CPU), an Field Programmable Gate Array (FPGA) or the like. The processor 101 can also be a multiprocessor. The information processing device 100 may be implemented by either a processing circuitry or software, firmware or a combination of software and firmware. Incidentally, the processing circuitry can be either a single circuit or a combined circuit.

The volatile storage device 102 is main storage of the information processing device 100. For example, the volatile storage device 102 is a Random Access Memory (RAM). The nonvolatile storage device 103 is auxiliary storage of the information processing device 100. For example, the nonvolatile storage device 103 is a Hard Disk Drive (HDD) or a Solid State Drive (SSD).

Further, the information processing device 100 is connected to an input device and a display. For example, the input device is a keyboard or a pointing device. Incidentally, illustration of the input device and the display is left out in FIG. 2.

Returning to FIG. 1, the information processing device 100 will be described below.

The information processing device 100 includes a storage unit 110, a cutout region extraction unit 120, a barycenter calculation unit 130, a support extraction unit 140, a judgment unit 150, a rotation axis determination unit 160, a height determination unit 170 and an output unit 160.

The storage unit 110 may be implemented as a storage area secured in the volatile storage device 102 or the nonvolatile storage device 103.

Part or all of the cutout region extraction unit 120, the barycenter calculation unit 130, the support extraction unit 140, the judgment unit 150, the rotation axis determination unit 160, the height determination unit 170 and the output unit 180 may be implemented by the processor 101.

Part or all of the cutout region extraction unit 120, the barycenter calculation unit 130, the support extraction unit 140, the judgment unit 150, the rotation axis determination unit 160, the height determination unit 170 and the output unit 180 may be implemented as modules of a program executed by the processor 101. For example, the program, executed by the processor 101 is referred to also as a judgment program. The judgment program has been recorded in a record medium, for example.

The storage unit 110 stores various items of information.

The cutout region extraction unit 120 acquires processing information from the storage unit 110. It is also possible for the cutout region extraction unit 120 to acquire the processing information from something other than the storage unit 110. The processing information is information regarding the processing of an object corresponding to a region cut out by a laser processing machine. As a concrete example, the processing information includes Numerical Control (NC) coordinates representing places where a head that outputs a laser beam passes through and information indicating whether the laser beam should be outputted or not at each of the NC coordinates. The NC coordinates are referred to as an apex or spices. Incidentally, the laser processing machine is a two-dimensional laser processing machine.

The cutout region extraction unit 120 extracts a region to be cut out by the laser processing machine based on the processing information. The region to be cut out is referred to as a cutout region. The region to be cut out may also be represented as a region to be cut away from a work that is a material.

Here, processes executed by the cutout region extraction unit 120 will be described by using FIGS. 3 to 9.

Figure 3:
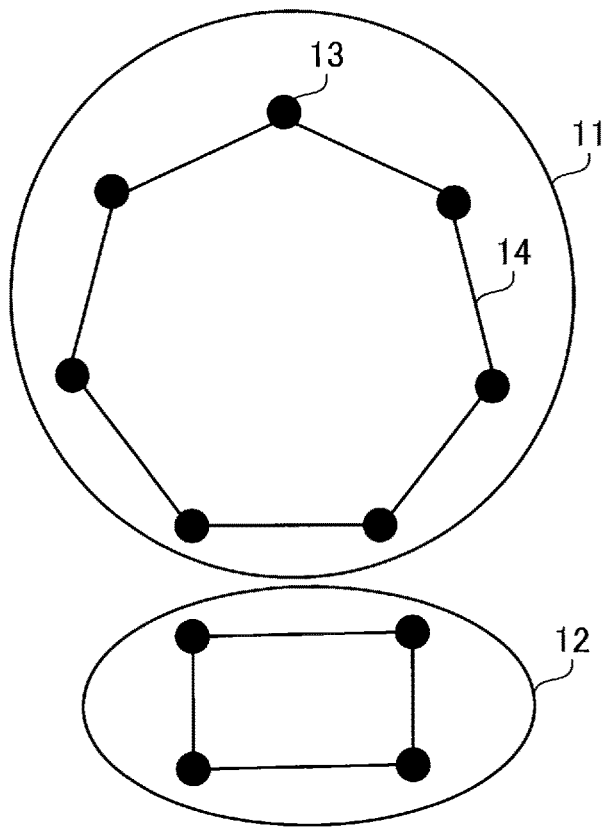
FIG. 3 is a diagram (No. 1) for explaining a process executed by a cutout region extraction unit in the first embodiment.

FIG. 3 is a diagram (No. 1) for explaining a process executed by the cutout region extraction unit in the first embodiment.

First, a set of apices from a cutting process starting point to a cutting process ending point is referred to as a graph. For example, FIG. 3 shows a graph 11 and a graph 12.

The apices forming a graph are referred to as nodes. For example, FIG. 3 shows nodes 13. A line connecting a node and a node is referred to as a link. For example, FIG. 3 shows links 14.

The cutout region extraction unit 120 executes various processes for each apex indicated by the processing information according to a processing order. The processes will be described in detail below.

When executing a process for the next apex, the cutout region extraction unit 120 executes an intersection judgment based on a line connecting an immediately previous node and the apex and links in all graphs. The cutout region extraction unit 120 calculates intersection points based on the intersection judgment. Since there is a possibility that the line connecting the immediately previous node and the apex intersects with a plurality of links, the cutout region extraction unit 120 sorts the calculated intersection points in the order of closeness to the immediately previous node. This will be explained below by using FIG. 4.

Figure 4:
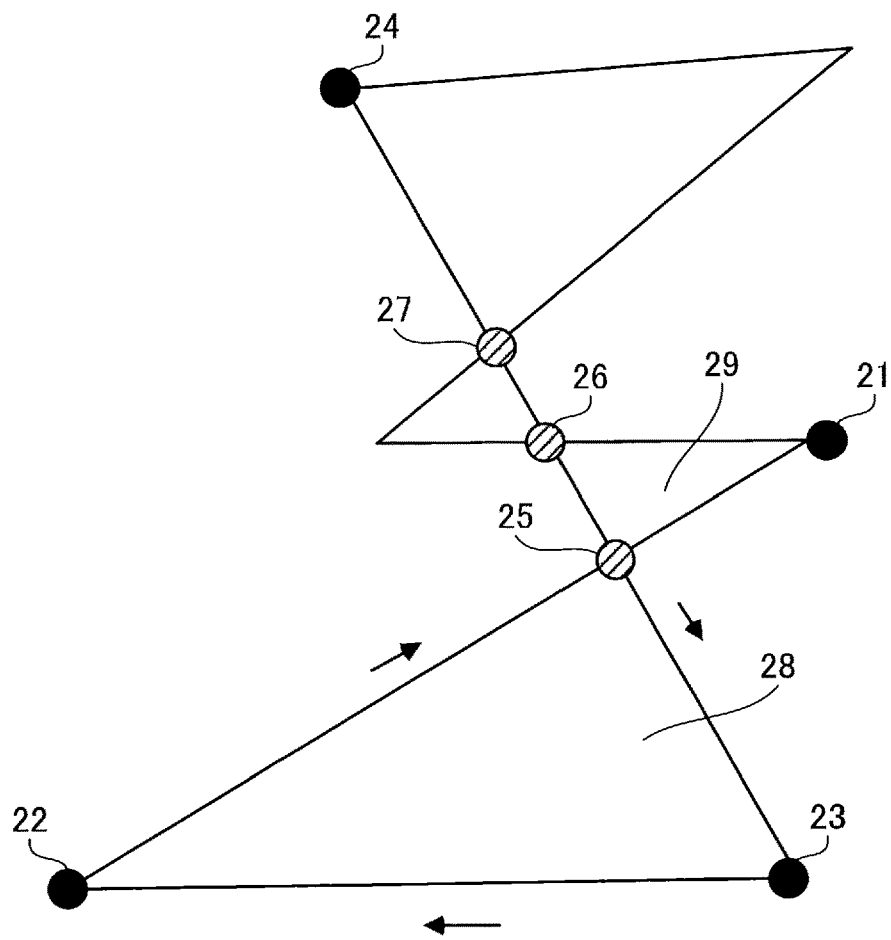
FIG. 4 is a diagram (No. 2) for explaining a process executed by the cutout region extraction unit in the first embodiment.

FIG. 4 is a diagram (No. 2) for explaining a process executed by the cutout region extraction unit in the first embodiment. FIG. 4 shows nodes 21 to 24. Further, FIG. 4 shows intersection points 25 to 27. For example, when cutting is executed towards the node 24 subsequently to the node 23, the cutout region extraction unit 120 sorts the intersection points in the order of the intersection points 25, 26 and 27.

Incidentally, when there is no intersection point as the result of the intersection judgment, the cutout region extraction unit 120 specifies the next apex as a node. The cutout region extraction unit 120 connects the node and the immediately previous node. By this operation, the cutout region extraction unit 120 is capable of generating a link.

When one or more intersection points have been calculated as the result of the intersection judgment, there is a possibility that a closed region has been generated, and thus the cutout region extraction unit 120 executes a closed region detection process in the sorted order. In the detection process, each intersection point is handled as a node. The cutout region extraction unit 120 segments an intersecting link. The cutout region extraction unit 120 generates two links based on the intersection point handled as a node and nodes situated at both ends of the intersecting link. For example, the cutout region extraction unit 120 segments a link connecting the node 21 and the node 22. Then, the cutout region extraction unit 120 generates a link connecting the node 21 and the intersection point 25 and a link connecting the node 22 and the intersection point 25. Further, the cutout region extraction unit 120 generates a link connecting the node 23 and the intersection point 25. For example, the cutout region extraction unit 120 detects the node 23 subsequently to the intersection point 25 by using the intersection point 25 as a starting point, via a link. The cutout region extraction unit 120 detects the node 22 subsequently to the node 23 via a link. The cutout region extraction unit 120 detects the intersection point 25 subsequently to the node 22 via a link. When the intersection point 25 is used as a starting point and the intersection point 25 is detected again as above, the cutout region extraction unit 120 detects a closed region 28. Incidentally, when the cutout region extraction 120 detects a plurality of nodes respectively connected to a plurality of links connected to a certain node, the cutout region extraction unit 120 specifies the plurality of nodes as detection targets. For example, when the cutout region extraction unit 120 detects the nodes 22 and 23 respectively connected to a plurality of links connected to the intersection point 25 handled as a node, the cutout region extraction unit 120 specifies the nodes 22 and 23 as detection targets.

Here, the node 23 is referred to also as first coordinates. The node 24 is referred to also as second coordinates. The link connecting the node 23 and the node 24 is referred to also as a first line. The link connecting the node 21 and the node 22 is referred to also as a second line calculated before the first line.

As above, the cutout region extraction unit 120 calculates the intersection point 25 where the link connecting the node 21 and the node 22 and the link connecting the node 23 and the node 24 intersect with each other. The cutout region extraction unit 120 extracts the closed region 28, which is a closed region based on the node 22, the node 23 and the intersection point 25, as a cutout region.

In the detection process, when the cutout region extraction unit 120 detects a node other than the starting point twice, the cutout region extraction unit 120 ends the detection process. When the detection process is ended, the cutout region extraction unit 120 excludes the links from the detection targets. For example, the starting point is assumed here to be the intersection point 26. Since a link connecting the intersection point 25 and the intersection point 26 and a link connecting the node 23 and the intersection point 26 are situated on the same straight line, the cutout region extraction unit 120 excludes a link connecting the node 23 and the intersection point 25 from the detection targets. In a process of detecting nodes in the order of the intersection point 25, the node 22 and the node 23, the intersection point 25 is detected again. Therefore, the cutout region extraction unit 120 ends the detection process. Then, the cutout region extraction unit 120 excludes the link connecting the node 22 and the node 23, the link connecting the node 22 and the intersection point 25 and the link connecting the node 23 and the intersection point 25 from the detection targets. Then, the cutout region extraction unit 120 detects the node 21 subsequently to the intersection point 25 via a link. The cutout region extraction unit 120 detects the intersection point 26 subsequently to the node 21 via a link. Since the intersection point 26 is used as the starting point and the intersection point 26 is detected again as above, the cutout region extraction unit 120 detects a closed region 29.

Figure 5:
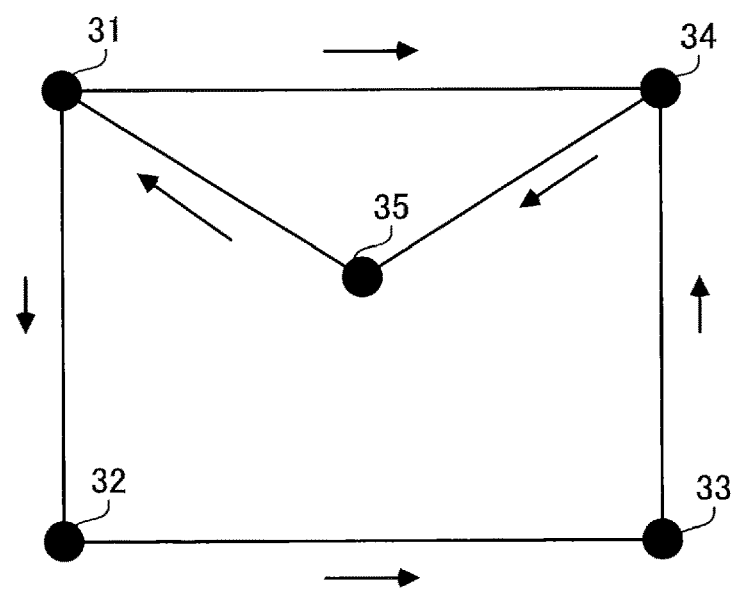
FIG. 5 is a diagram (No. 3) for explaining a process executed by the cutout region extraction unit in the first embodiment.

FIG. 5 is a diagram (No. 3) for explaining a process executed by the cutout region extraction unit in the first embodiment. FIG. 5 shows nodes 31 to 35.

Further, FIG. 5 shows a region of the nodes 31, 32, 33 and 34 and a region of the nodes 31, 34 and 35. When a cutting process is executed in the order of the node 31, the node 32, the node 33, the node 34, the node 35, the node 31 and the node 34, the region of the nodes 31, 32, 33 and 34 and the region of the nodes 31, 34 and 35 are detected as cutout regions. Which cutout region, i.e., which of the region of the nodes 31, 32, 33 and 34 and the region of the nodes 31, 34 and 35, is selected as a new cutout region will be explained below. The cutout region extraction unit 120 compares the nodes 31, 32, 33 and 34 and the nodes 31, 34 and 35. Then, the cutout region extraction unit 120 extracts one node that is not common. For example, the cutout region extraction unit 120 extracts the node 35. The node 35 is contained in the region of the nodes 31, 32, 33 and 34. When the node not common is contained in the other region as above, the cutout reg-on extraction unit 120 judges the region including the node not common as the new cutout region. For example, the cutout region extraction unit 120 judges the region of the nodes 31, 34 and 35 as the new cutout region.

When a cutting process is executed in the order of the node 31, the node 32, the node 33, the node 34, the node 35, the node 31 and the node 34, the node 35, the link connecting the node 31 and the node 35 and the link connecting the node 34 and the node 35 are cut away. Therefore, the cutout region extraction unit 120 excludes the node 35, the link connecting the node 31 and the node 35 and the link connecting the node 34 and the node 35 from targets of the judgment process for the extraction as a cutout region. Namely, a link used twice as a link of a cutout region is excluded from the targets of the judgment process for the extraction as a cutout region. Further, the cutout region extraction unit 120 excludes the node 35 from the targets due to the exclusion of the link connecting the node 31 and the node 35 and the link connecting the node 34 and the node 35 from the targets.

Figure 6:
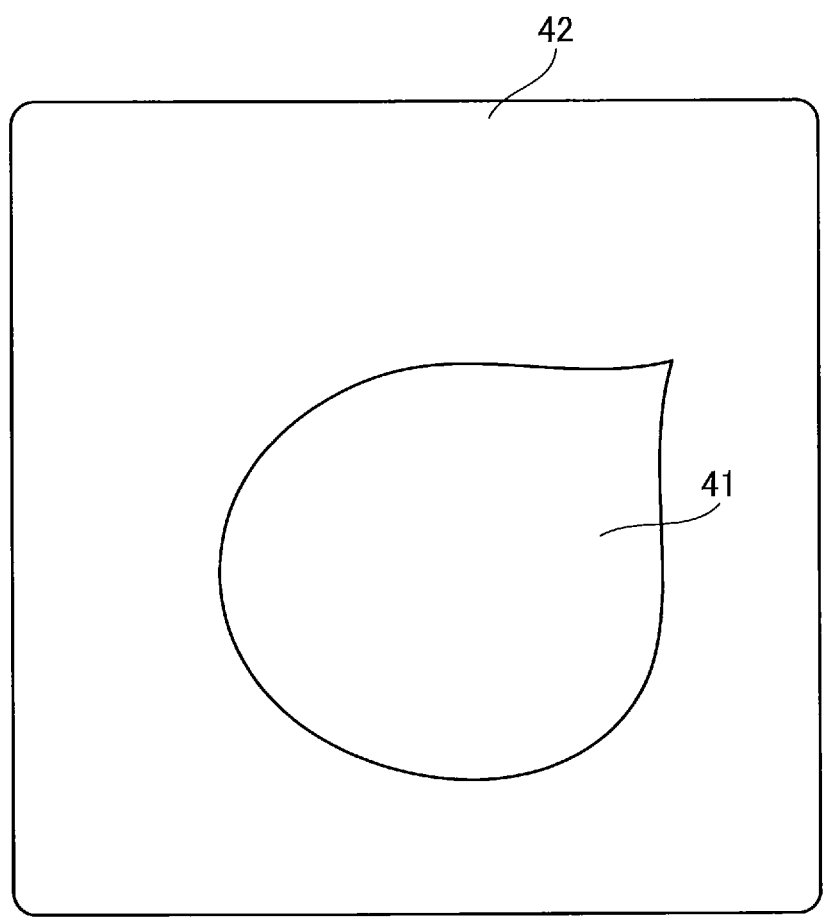
FIG. 6 is a diagram (No. 4) for explaining a process executed by the cutout region extraction unit in the first embodiment.

FIG. 6 is a diagram (No. 4) for explaining a process executed by the cutout region extraction unit in the first embodiment. When the region 42 is cut out after the region 41 is cut out, the cutout region extraction unit 120 excludes all links and nodes related to the region 41 from the targets of the judgment process for the extraction as a cutout region. Further, the cutout region extraction unit 120 manages the links and nodes related to the region 41 as internal information regarding the region 42. The cutout region extraction unit 120 also manages cutout regions shown in FIG. 7 in a similar manner.

Figure 7:
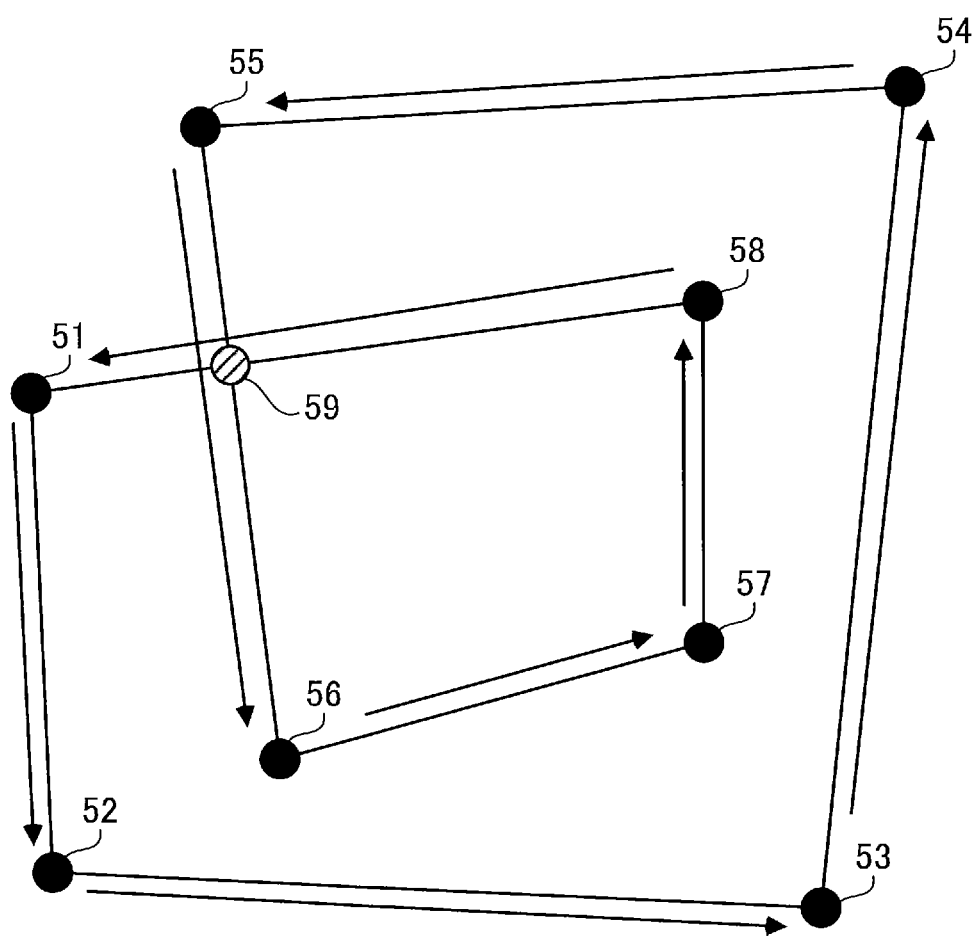
FIG. 7 is a diagram (No. 5) for explaining a process executed by the cutout region extraction unit in the first embodiment.

FIG. 7 is a diagram (No. 5) for explaining a process executed by the cutout region extraction unit in the first embodiment. FIG. 7 shows nodes 51, 52, 53, 54, 55, 56, 57 and 58 and an intersection point 59. When a cutting process is executed in the order of the node 51, the node 52, the node 53, the node 54, the node 55, the node 56, the node 57, the node 58 and the node 51, a region corresponding to the nodes 56, 57 and 58 and the intersection point 59 is cut away. The links and nodes of the region corresponding to the nodes 56, 57 and 58 and the intersection point 59 are managed as internal information regarding a region corresponding to the nodes 51, 52, 53, 54, 55, 56, 57 and 58 and the intersection point 59.

Figure 8:
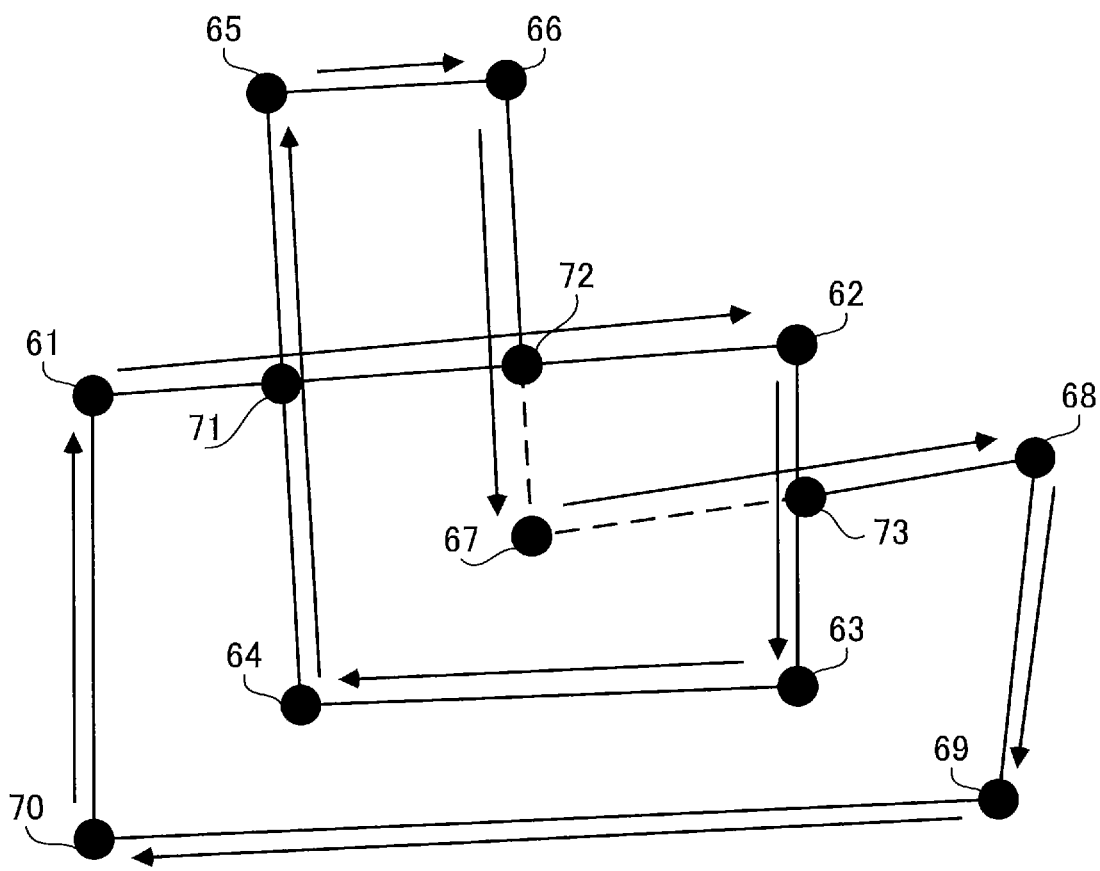
FIG. 8 is a diagram (No. 6) for explaining a process executed by the cutout region extraction unit in the first embodiment.

FIG. 8 is a diagram (No. 6) for explaining a process executed by the cutout region extraction unit in the first embodiment. FIG. 8 shows nodes 61, 62, 63, 64, 65, 66, 67, 68, 69, 70, 71, 72 and 73.

When a cutting process is executed in the order of the node 61, the node 62, the node 63, the node 64, the node 65, the node 66, the node 67, the node 68, the node 69, the node 70 and the node 61, the cutting process includes a step of cutting a region that has already been cut out. For example, the step is a step of executing a cutting process in the order of the node 72, the node 67 and the node 73. The cutout region extraction unit 120 does not add the links and nodes corresponding to the region already cut out.

When a processing reference point is contained in another cutout region, the cutout region extraction unit 120 judges that the processing reference point has already been cut out. Incidentally, the processing reference point is the node 67, for example. Further, when the cutout region extraction unit 120 newly generates a link, if a midpoint of the link to be generated is already contained in another cutout region, the cutout region extraction unit 120 judges that a processing locus is already contained in another cutout region. In this case, the cutout region extraction unit 120 does not generate the link connecting nodes.

Figure 9:
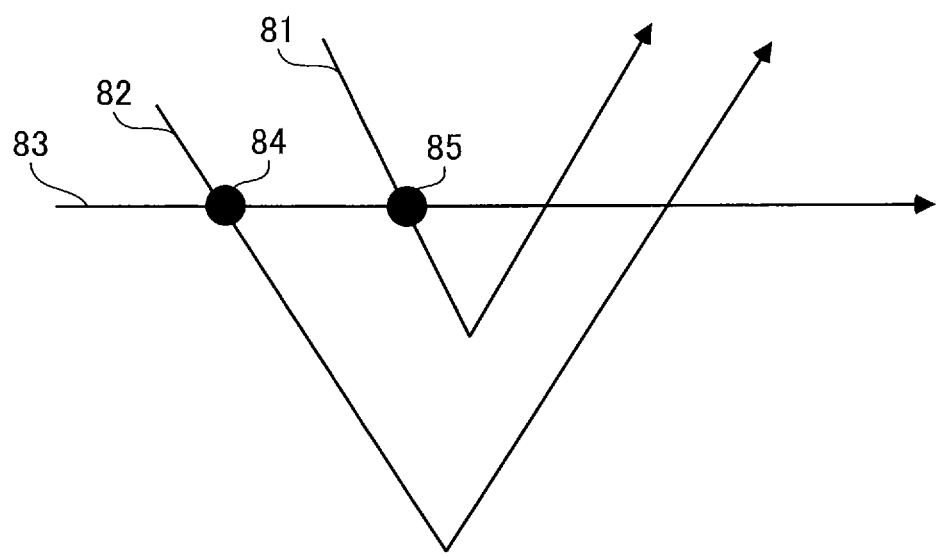
FIG. 9 is a diagram (No. 7) for explaining a process executed by the cutout region extraction unit in the first embodiment.

FIG. 9 is a diagram (No. 7) for explaining a process executed by the cutout region extraction unit in the first embodiment. When the cutout region extraction unit 120 executes the intersection judgment, there are cases where a graph intersects with another graph. When a graph intersects with another graph, the cutout region extraction unit 120 combines the former graph and the latter graph.

FIG. 9 shows graphs 81, 82 and 83. The cutout region extraction unit 120 executes a cutting process in the order of the graph 81, the graph 82 and the graph 83. When the cutting process of the graph 83 is executed by the cutout region extraction unit 120, the graph 82 and the graph 83 intersect with each other at a point 84. Therefore, the cutout region extraction unit 120 combines the graph 82 and the graph 83 together. Then, the cutout region extraction unit 120 handles the graph 82 and the graph 83 as one graph. Further, when the cutting process of the graph 83 is executed by the cutout region extraction unit 120, the graph 812 and the graph 83 intersect with each other at a point 85. Therefore, the cutout region extraction unit 120 combines the graph 81 and the graph 83 together. Then, the cutout region extraction unit 120 handles the graph 81, the graph 82 and the graph 83 as one graph.

As above, the cutout region extraction unit 120 extracts cutout region information indicating the cutout regions. Further, the cutout region extraction unit 120 extracts a plurality of sets of apex coordinates indicating the cutout regions.

The barycenter calculation unit 130 calculates the barycenter of each cutout region. Specifically, the barycenter calculation unit 130 calculates the barycenter of each cutout region by using a plurality of sets of apex coordinates.

When a region to be at out exists in a cutout region, the barycenter calculation unit 130 calculates the barycenter of the cutout region in consideration of the region to be cut out. When the cutout region has a concavity, there are cases where the position of the barycenter is outside the cutout region.

The above-described method is just an example of the method of calculating the barycenter. Thus, the barycenter calculation unit 130 may also calculate the barycenter of the cutout region by a different method.

Further, the barycenter calculation unit 130 calculates the area of the cutout region. The barycenter calculation unit 130 calculates the weight of an object corresponding to the cutout region based on the area and a surface density. This calculation method is a calculation method for cases where the object is a metal plate having a uniform surface density. This calculation method is just an example. Thus, the weight may also be calculated by a different calculation method.

As above, the barycenter calculation unit 130 calculates the barycenter of the cutout region and the weight of an object corresponding to the cutout region. The barycenter of the cutout region may also be represented as the barycenter of an object corresponding to the cutout region.

Next, the support extraction unit 140 will be described below.

Based on the cutout region information and support information indicating one or more supports supporting the object corresponding to the cutout region, the support extraction unit 140 extracts a support supporting the object at an outermost position among the one or more supports. Further, the support extraction unit 140 extracts a support count as the number of supports supporting the object at the outermost positions. Here, the object is a component, for example. In the following description, the object is assumed to be a component.

The method of extracting supports will be described concretely below.

Figure 10:
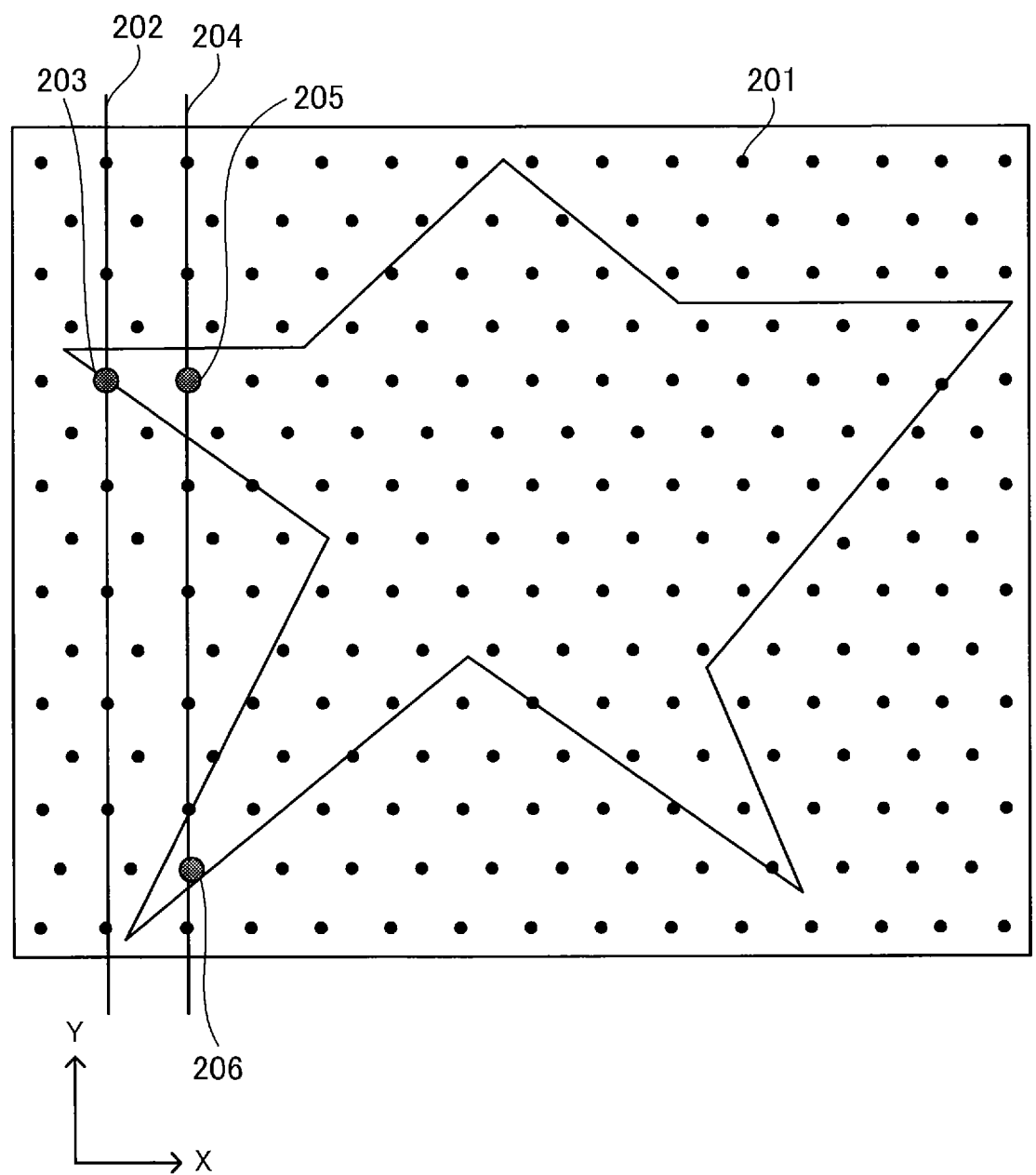
FIG. 10 shows a concrete example of a support extraction method in the first embodiment.

FIG. 10 shows a concrete example of a support extraction method in the first embodiment. FIG. 10 indicates an X-axis and a Y-axis. The support extraction unit 140 acquires information indicating a plurality of supports from the storage unit 110. The support extraction unit 140 combines the information indicating a plurality of supports with the cutout region. FIG. 10 shows a plurality of supports. FIG. 10 shows a support 201, for example. Here, the support is referred to also as a support member. Here, the one or more supports supporting the component corresponding to the cutout region are represented by two-dimensional coordinates based on the X-axis and the Y-axis. Incidentally, the X-axis is referred to also as a first axis. The Y-axis is referred to also as a second axis.

The support extraction unit 140 calculates a maximum value and a minimum value of the X coordinate among the one or more supports supporting the component corresponding to the cutout region. Further, the support extraction unit 140 calculates a maximum value and a minimum value of the Y coordinate among the one or more supports supporting the component corresponding to the cutout region.

The support extraction unit 140 extracts a support having the minimum value of the X coordinate among the one or more supports supporting the component corresponding to the cutout region. The support extraction unit 140 extracts a support having a maximum value of the Y coordinate and a support having a minimum value of the Y coordinate from one or more supports situated on an axis 202 where the minimum value of the X coordinate is situated and supporting the component corresponding to the cutout region. Since there is only one such support in FIG. 10, the support extraction unit 140 extracts a support 203.

The support extraction unit 140 extracts a support 205 having a maximum value of the Y coordinate and a support 206 having a minimum value of the Y coordinate from one or more supports situated on an axis 204 and supporting the component corresponding to the cutout region.

The support extraction unit 140 generates a line connecting the support 203 and the support 205 and a line connecting the support 203 and the support 206. However, when the Y coordinate of the support 205 is smaller than the Y coordinate of the support 203, the support extraction unit 140 does not generate the line connecting the support 203 and the support 205. Further, when the Y coordinate of the support 206 is larger than the Y coordinate of the support 203, the support extraction unit 140 does not generate the line connecting the support 203 and the support 206.

The support extraction unit 140 judges whether or not the Y coordinate of the extracted support equals the calculated maximum value of the Y coordinate or the calculated minimum value of the Y coordinate. When the Y coordinate of the extracted support equals the maximum value of the Y coordinate or the minimum value of the Y coordinate, the support extraction unit 140 stops the search for the support having the maximum value of the Y coordinate or the support having the minimum value of the Y coordinate. For example, the support extraction unit 140 stops the search for the support having the minimum value of the Y coordinate since the Y coordinate of the support 206 equals the calculated minimum value.

Further, when an angle based on the line generated immediately before and the line currently generated is a concave angle or the line generated immediately before and the line currently generated are the same straight line, the support extraction unit 140 generates a line that connects a support at the other end of the line generated immediately before and the currently detected support.

As above, the support extraction unit 140 repeats the above-described process for each axis until the support having the calculated maximum value of the Y coordinate and the support having the calculated minimum value of the Y coordinate are extracted.

The support extraction unit 140 extracts a support having the maximum value of the X coordinate among the one or more supports supporting the component corresponding to the cutout region. The support extraction unit 140 repeats a process the same as the above-described process for each axis towards a direction in which the X coordinate value decreases.

Then, the support extraction unit 140 extracts supports corresponding to the maximum coordinate value in regard to the X-axis, the minimum coordinate value in regard to the X-axis, the maximum coordinate value in regard to the Y-axis and the minimum coordinate value in regard to the Y-axis among the one or more supports supporting the component corresponding to the cutout region.

Figure 11:
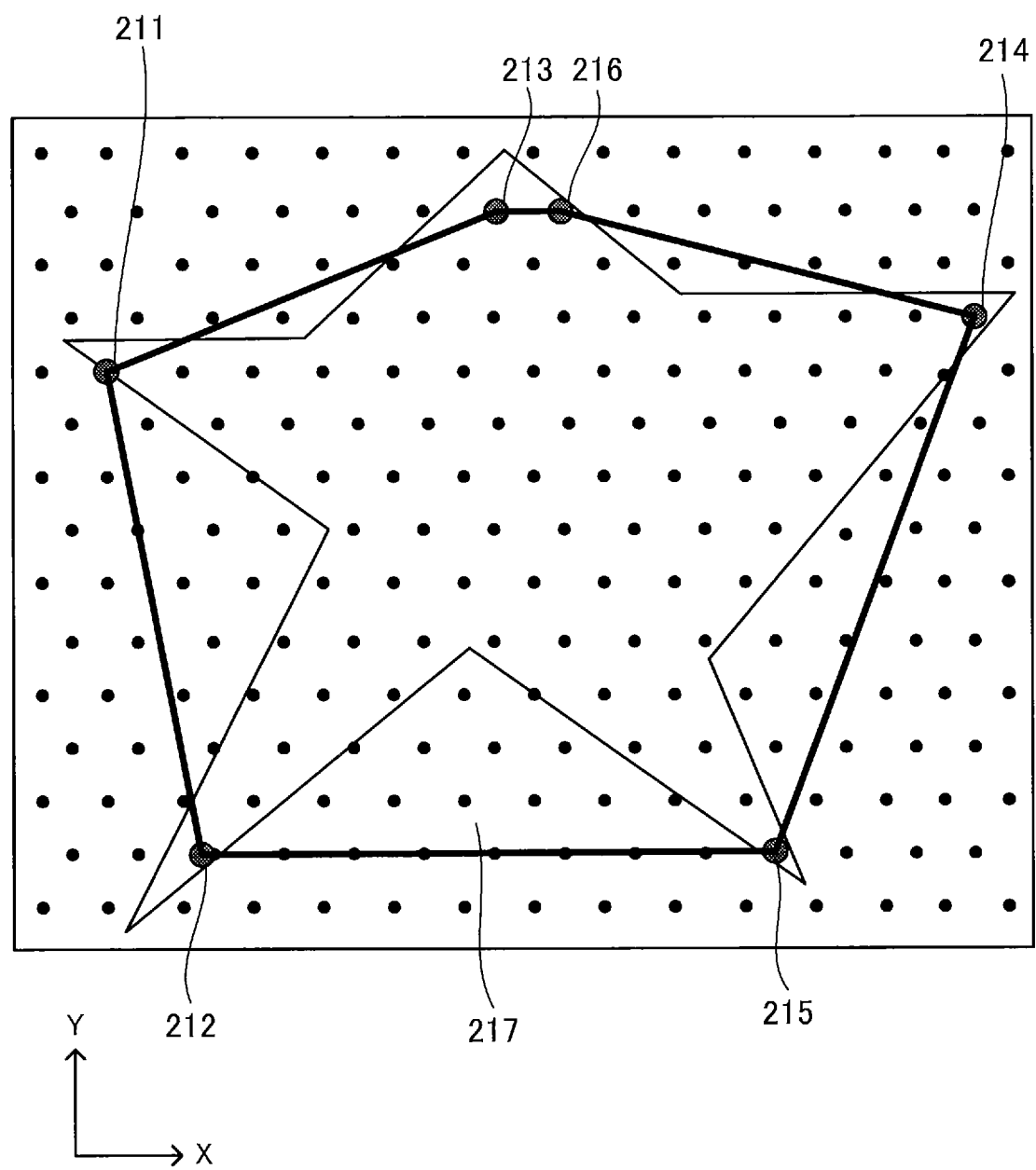
FIG. 11 is a diagram showing the result of the concrete example of the support extraction method in the first embodiment.

FIG. 11 is a diagram showing the result of the concrete example of the support extraction method in the first embodiment. FIG. 11 shows supports 211 to 216 extracted by the support extraction unit 140.

Then, the support extraction unit 140 connects the supports corresponding to the maximum coordinate value in regard to the X-axis, the minimum coordinate value in regard to the X-axis, the maximum coordinate value in regard to the Y-axis and the minimum coordinate value in regard to the Y-axis by lines. The plurality of supports connected by the lines constitute a support apex set. A region based on the plurality of supports connected by the lines is referred to as a first region. FIG. 11 shows a first region 217.

After the extraction of the supports, the support extraction unit 140 extracts the support count. Specifically, the support count is the sum total of the number of supports corresponding to the maximum coordinate value in regard to the X-axis among the supports supporting the component at the outermost positions, the number of supports corresponding to the minimum coordinate value in regard to the X-axis among the supports supporting the component at the outermost positions, the number of supports corresponding to the maximum coordinate value in regard to the Y-axis among the supports supporting the component at the outermost positions, and the number of supports corresponding to the minimum coordinate value in regard to the Y-axis among the supports supporting the component at the outermost positions. FIG. 11 indicates that the support count is 6.

The support extraction unit 140 may also extract the supports by means of calculation since the supports are arranged at even intervals. Further, the supports can also be information indicating the supports inputted to the information processing device 100 by an operation by a user. The supports can also be information indicating the supports received by the information processing device 100 from another device. The supports may also be detected based on an image captured by an image capturing device.

Next, the judgment unit 150 will be described below. The judgment unit 150 judges whether the component corresponding to the cutout region will incline and rise by being supported by the one or more supports or not based on the support count. This sentence may also be expressed as follows: The judgment unit 150 judges whether the component corresponding to the cutout region will incline and rise between/among a plurality of supports or not based on the support count.

A process executed by the judgment unit 150 will be described in detail below.

Figure 12:
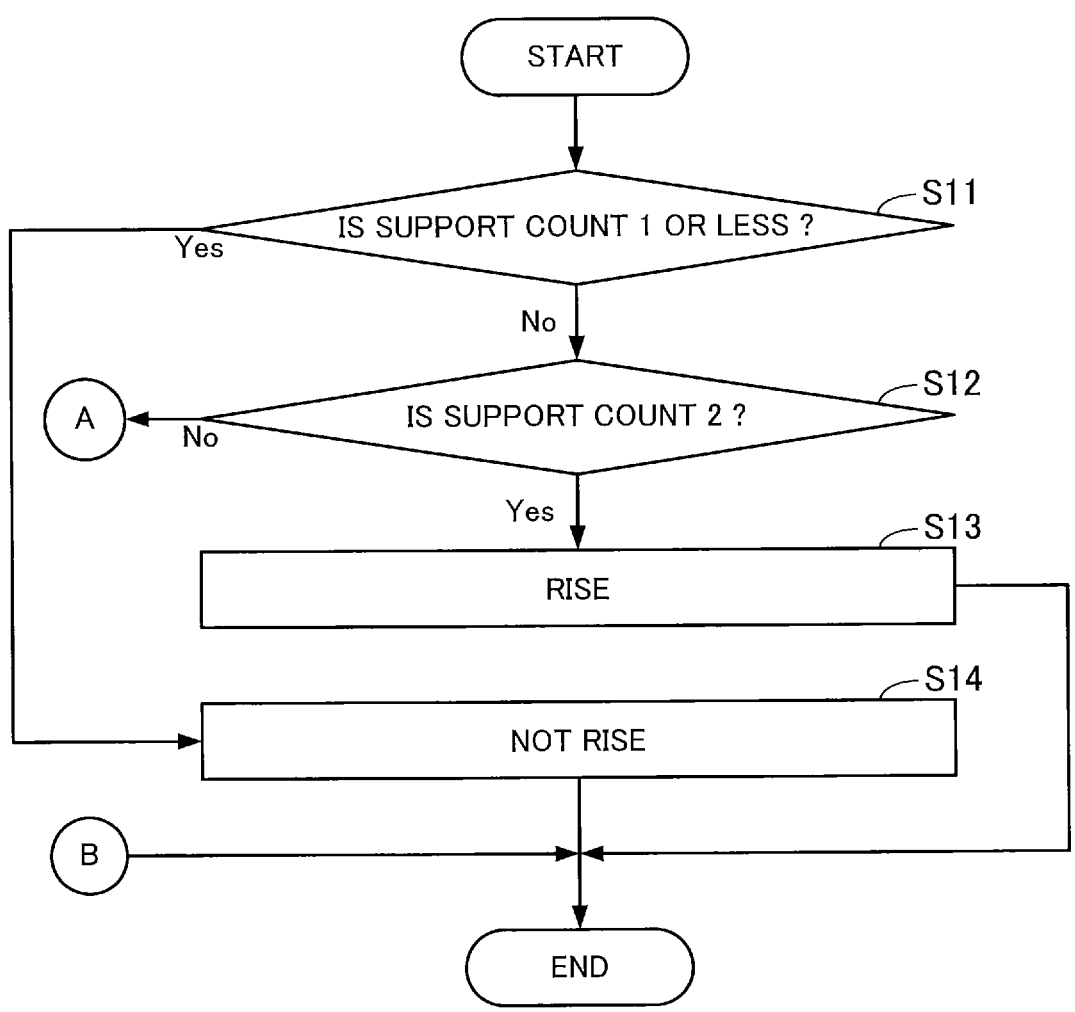
FIG. 12 is a flowchart (No. 1) showing a process of a judgment unit in the first embodiment.

FIG. 12 is a flowchart (No. 1) showing the process of the judgment unit in the first embodiment.

(Step S11) The judgment unit 150 judges whether or not the extracted support count is 1 or less. When the extracted support count is 1 or less, the judgment unit 150 advances the process to step S14. When the extracted support count is 2 or more, the judgment unit 150 advances the process to step S12.

(Step S12) The judgment unit 150 judges whether or not the extracted support count is 2. When the extracted support count is 2, the judgment unit 150 advances the process to step S13. When the extracted support count is 3 or more, the judgment unit 150 advances the process to step S21.

(Step S13) The judgment unit 150 judges that the component corresponding to the cutout region will incline and rise by being supported by the one or more supports. Then, the judgment unit 150 ends the process.

(Step S14) The judgment unit 150 judges that the component corresponding to the cutout region will not incline and rise by being supported by the one or more supports. Then, the judgment unit 150 ends the process.

Figure 13:
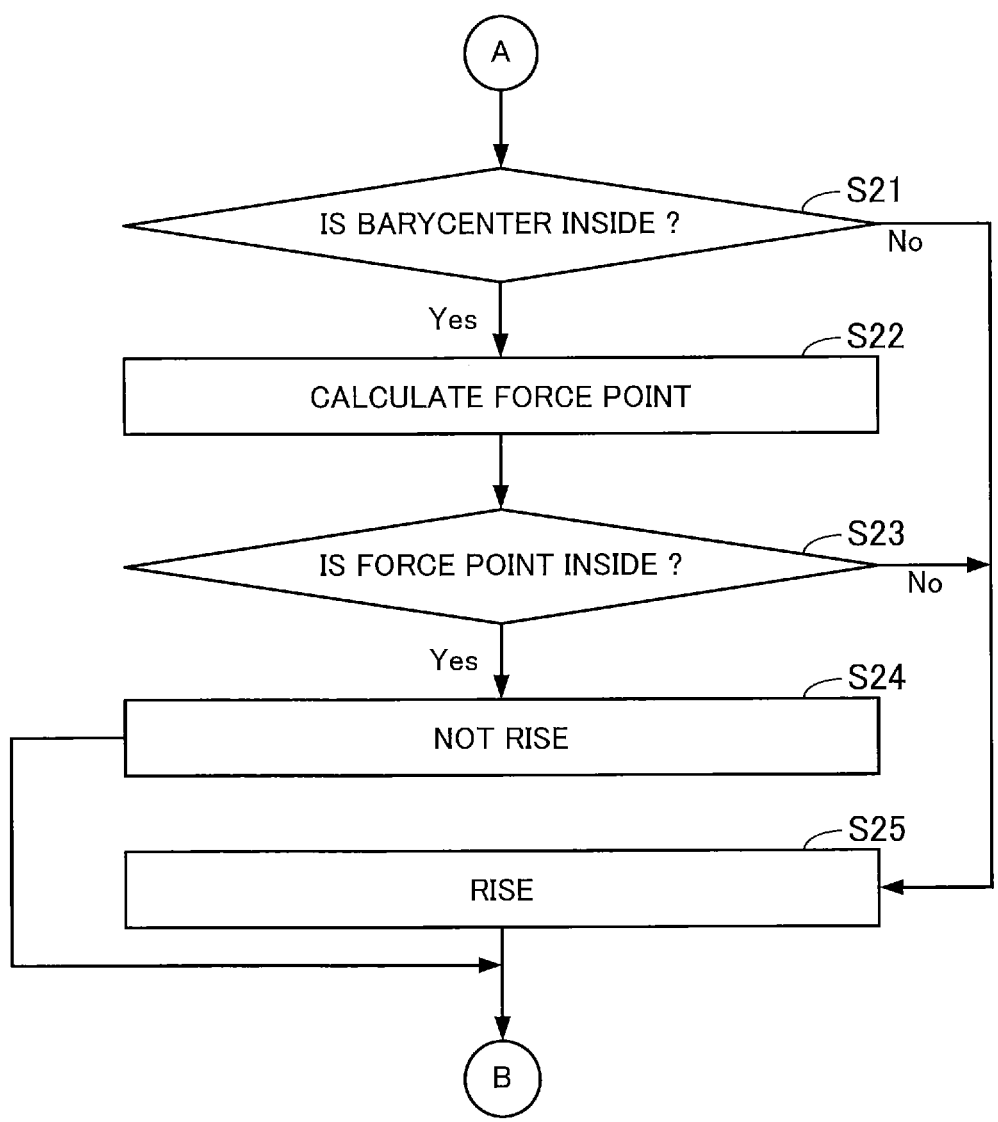
FIG. 13 is a flowchart (No. 2) showing the process of the judgment unit in the first embodiment.

FIG. 13 is a flowchart (No. 2) showing the process of the judgment unit in the first embodiment.

(Step S21) The judgment unit 150 judges whether or not the barycenter calculated by the barycenter calculation unit 130 is inside the first region. When the barycenter is inside the first region, the judgment unit 150 advances the process to step S22. When the barycenter is outside the first region, the judgment unit 150 advances the process to step S25.

(Step S22) The judgment unit 150 calculates a force point as a central point of a combined moment by using a plurality of impulsive forces, as impulsive forces at a plurality of representative points selected from a range where gas spouts out, and the barycenter of the cutout region. Incidentally, the gas is assist gas. The impulsive force is referred to also as gas spout pressure. The plurality of impulsive forces may also be represented as follows: The plurality of impulsive forces are impulsive forces corresponding to a plurality of representative points selected from a range where gas spouts out.

Here, the impulsive force due to the gas spout will be explained.

Figure 14:
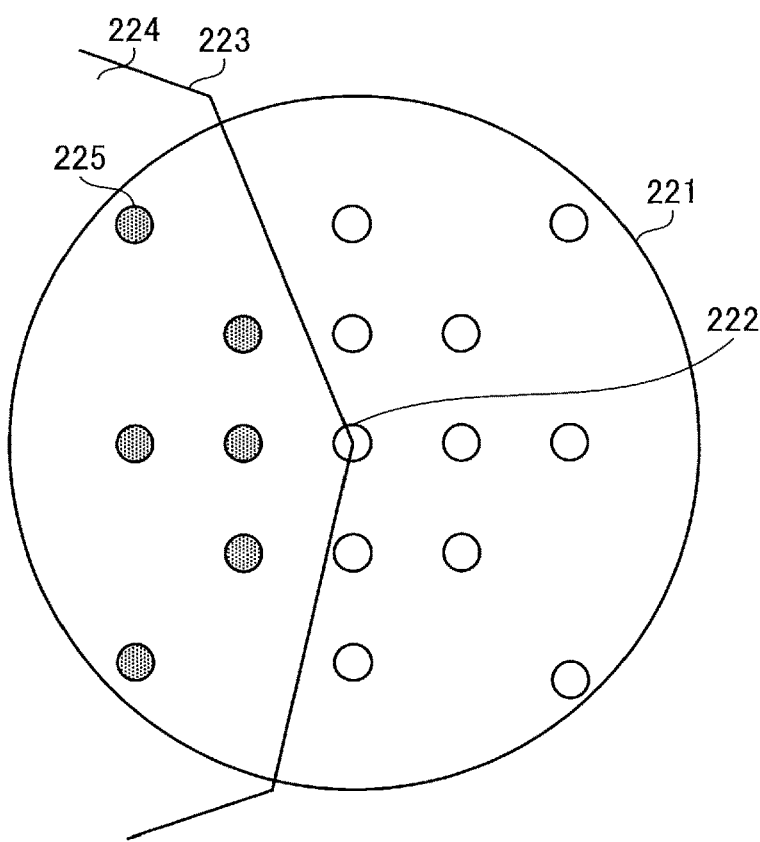
FIG. 14 is a diagram for explaining impulsive force due to a gas spout in the first embodiment.

FIG. 14 is a diagram for explaining the impulsive force due to the gas spout in the first embodiment. Here, the gas scatters in a certain range. Incidentally, there are cases where it is considered that there is only one place to which the impulsive force due to the gas spout is applied. For example, the impulsive force is applied to a place corresponding to the center of the range where the gas spouts out. When the place to which the impulsive force is applied is outside the cutout region, this way of consideration concludes that no impulsive force is applied to the component corresponding to the cutout region. Therefore, the impulsive force due to the gas spout is considered to be applied to a plurality of places.

FIG. 14 shows a range 221 in which the gas scatters. The center of the range 227 is a center 222. FIG. 14 also shows a processing locus 223. The impulsive force due to the gas spout is applied to the range 221. In FIG. 14, the places where the impulsive force due to the gas spout is applied to a cutout region 224 are indicated as points. The points to which the impulsive force due to the gas spout is applied include a point 225, for example.

In the calculation of the combined moment, the plurality of points to which the impulsive force is applied are selected from a range of pressure distribution. For the calculation of the combined moment, it is possible to use information such as the type of a nozzle, the spout pressure of the gas, the height of the nozzle, a nozzle diameter, the angle of the nozzle, room temperature, atmospheric pressure, and pressure distribution data based on the shape of the nozzle. These items of information may be stored in the storage unit 110.

Here, the pressure distribution will be explained. As the pressure distribution, a pressure distribution model obtained by an experiment or the like is used. Namely, a predetermined pressure distribution model is used as the pressure distribution. It is permissible even if no pressure distribution model is used. In the case where no pressure distribution model is used, the pressure distribution is determined based on the type of the nozzle. For example, when the nozzle discharging the gas is a critical nozzle, Gaussian distribution is used as the pressure distribution. Gaussian distribution is referred to also as normal distribution. Incidentally, the critical nozzle is a nozzle in which the gas flow speed reaches the speed of sound at the outlet of the nozzle. When the nozzle discharging the gas is a supersonic nozzle, for example, the pressure distribution is assumed to be uniform distribution of pressure. Incidentally, the supersonic nozzle is a nozzle in which the gas flow speed exceeds the speed of sound at the outlet of the nozzle.

Here, the method of selecting the plurality of points to which the impulsive force is applied will be explained concretely. The plurality of points will hereinafter be referred to as a plurality of representative points.

Figure 15:
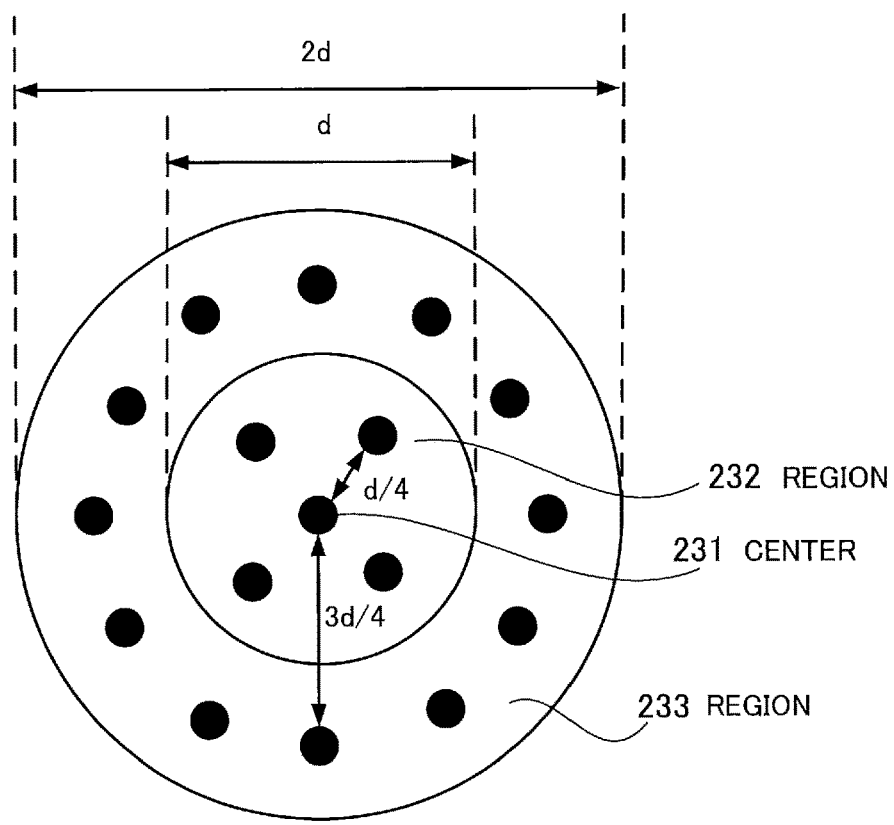
FIG. 15 is a diagram showing a concrete example of a method of selecting a plurality of representative points in the first embodiment.

FIG. 15 is a diagram showing a concrete example of the method of selecting the plurality of representative points in the first embodiment. In FIG. 15, the range in which the gas scatters are assumed to be a circle having a diameter $2d$, and the impulsive force in two regions: a circular region 232 having a diameter $d$ and a region 233 corresponding to the diameter $d$ to the diameter $2d$, is evaluated. When Gaussian distribution is used, the diameter $2d$ is defined as a range including 96% of the whole impulsive force. Incidentally, a center 231 is the center of the circle having the diameter $d$ and the circle having the diameter $2d$.

Four points at positions at a distance $d/4$ from the center 231 are selected as a plurality of representative points. Further, twelve points at positions at a distance $3d/4$ from the center 231 are selected as a plurality of representative points. In the case where the gas pressure is distributed uniformly, the impulsive force at each of the plurality of selected representative points equals $\pi Pd2/16$.

As above, in the case where the nozzle is a supersonic nozzle, the places to which a plurality of impulsive forces are respectively applied are selected based on distribution in which the pressure is uniform.

Also in cases where Gaussian distribution is used, the plurality of representative points are selected as described above. Then, the impulsive force is calculated by using the following expression (1) when there is no angular dependence:

$$PF = \int P(r)dS = \int\int_0^{2\pi} rP(r)d\theta dr = 2\pi \int rP(r)dr \qquad (1)$$

Incidentally, P(r) represents the pressure distribution. The character r represents the distance from the center of the range in which the gas scatters. For example, when FIG. 15 is used, total impulsive force in the circle of the diameter d is obtained as a definite integral $PF_1$. Incidentally, r ranges from 0 to $d/2$. The impulsive force at each of the plurality of representative points in the circle of the diameter d is $PF_1/4$. Further, total impulsive force in the circle of the diameter $2d$ is obtained as a definite integral $PF_2$. Incidentally, r ranges from $d/2$ to d. The impulsive force at each of the plurality of representative points at the positions at the distance $3d/4$ from the center 231 is $PF_2/12$.

The impulsive force at the center 231 may be one in the plurality of representative points.

As above, the places to which a plurality of impulsive forces are respectively applied are selected based on a predetermined pressure distribution model. In the case where the nozzle is a critical nozzle, the places to which a plurality of impulsive forces are respectively applied are selected based on Gaussian distribution.

Incidentally, the method of selecting a plurality of representative points is not limited to the method described above.

The judgment unit 150 calculates the X coordinate MX of the central point of the combined moment by using the following expression (2):

$$MX = (gmX_0 + F_1X_1 + F_2X_2 + \ldots + F_nX_n)/(gm + F_1 + F_2 + \ldots + F_n) \qquad (2)$$

The character g represents the gravitational acceleration. The character m represents the weight of the component corresponding to the cutout region. The character $X_0$ represents the X coordinate of the barycenter of the cutout region. Each character $F_i$ represents the impulsive force at each representative point. Each character $X_i$ represents the X coordinate of each representative point. Incidentally, i is an integer greater than or equal to 1.

The judgment unit 150 calculates the Y coordinate MY of the center of the combined moment by using the following expression (3):

$$MY = (gmY_0 + F_1Y_1 + \ldots + F_nY_n)/(gm + F_1 + F_2 + \ldots + F_n) \qquad (3)$$

The character $Y_0$ represents the Y coordinate of the barycenter of the cutout region. Each character $Y_i$ represents the Y coordinate of each representative point.

The center of the combined moment is referred to as the force point. Namely, the force point is represented by the X coordinate MX and the Y coordinate MY. Further, in the case where the judgment in the step S21 is No, the barycenter is referred to as the force point.

(Step S23) The judgment unit 150 judges whether or not the force point is inside the first region. When the force point is inside the first region, the judgment unit 150 advances the process to step S24. When the force point is outside the first region, the judgment unit 150 advances the process to step S25.

(Step S24) The judgment unit 150 judges that the component corresponding to the cutout region is stable due to support by a plurality of supports. Then, the judgment unit 150 judges that the component corresponding to the cutout region will not incline and rise by being supported by the one or more supports. The judgment unit 150 ends the process.

(Step S25) The judgment unit 150 judges that the component corresponding to the cutout region will incline and rise by being supported by the one or more supports. Then, the judgment unit 150 ends the process.

Here, when the step S13 or the step S25 has been executed, the information processing device 100 executes a rotation axis determination process.

Next, the rotation axis determination unit 160 will be described below. The rotation axis determination unit 160 executes the rotation axis determination process.

When the step S13 has been executed, the rotation axis determination unit 160 determines a line connecting the two supports as the rotation axis. When the step S25 has been executed, the rotation axis determination unit 160 determines the rotation axis as shown in FIG. 16.

Figure 16:
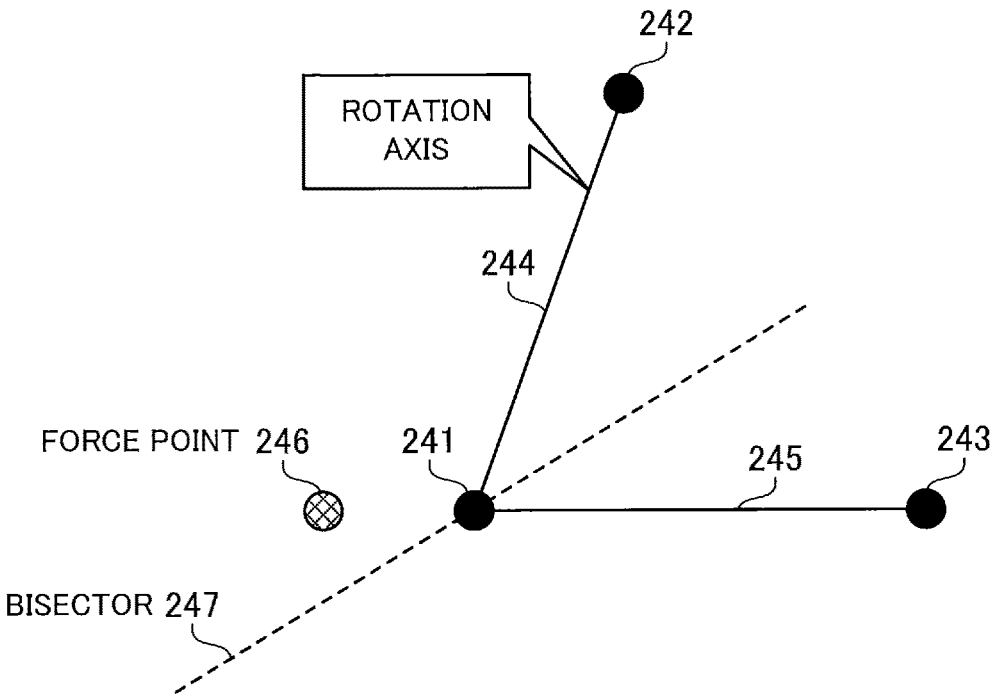
FIG. 16 is a diagram showing a concrete example of a rotation axis determination process in the first embodiment.

FIG. 16 is a diagram showing a concrete example of the rotation axis determination process in the first embodiment. Supports 241, 242 and 243 are supports extracted by the support extraction unit 140. The supports 242 and 243 are supports situated adjacent to the support 241. Incidentally, the supports 242 and 243 are referred to also as a plurality of second supports. A line 244 is a line connecting the support 241 and the support 242. A line 245 is a line connecting the support 241 and the support 243.

The rotation axis determination unit 160 detects the support 241 closest to a force point 246 among the supports extracted by the support extraction unit 140. Incidentally, the support 241 is referred to also as a first support. The rotation axis determination unit 160 detects the lines 244 and 245 connected to the support 241. The rotation axis determination unit 160 calculates a bisector 247 that bisects an angle based on the lines 244 and 245.

The rotation axis determination unit 160 detects that the force point 246 is situated in a direction of the line 244 with reference to the bisector 247. The rotation axis determination unit 160 determines the line 244 as the rotation axis. As above, the rotation axis determination unit 160 determines the rotation axis based on the supports 241, 242 and 243 and the force point 246.

Next, the height determination unit 170 will be described below. The height determination unit 170 determines the height when the component rises as shown in FIG. 17.

Figure 17:
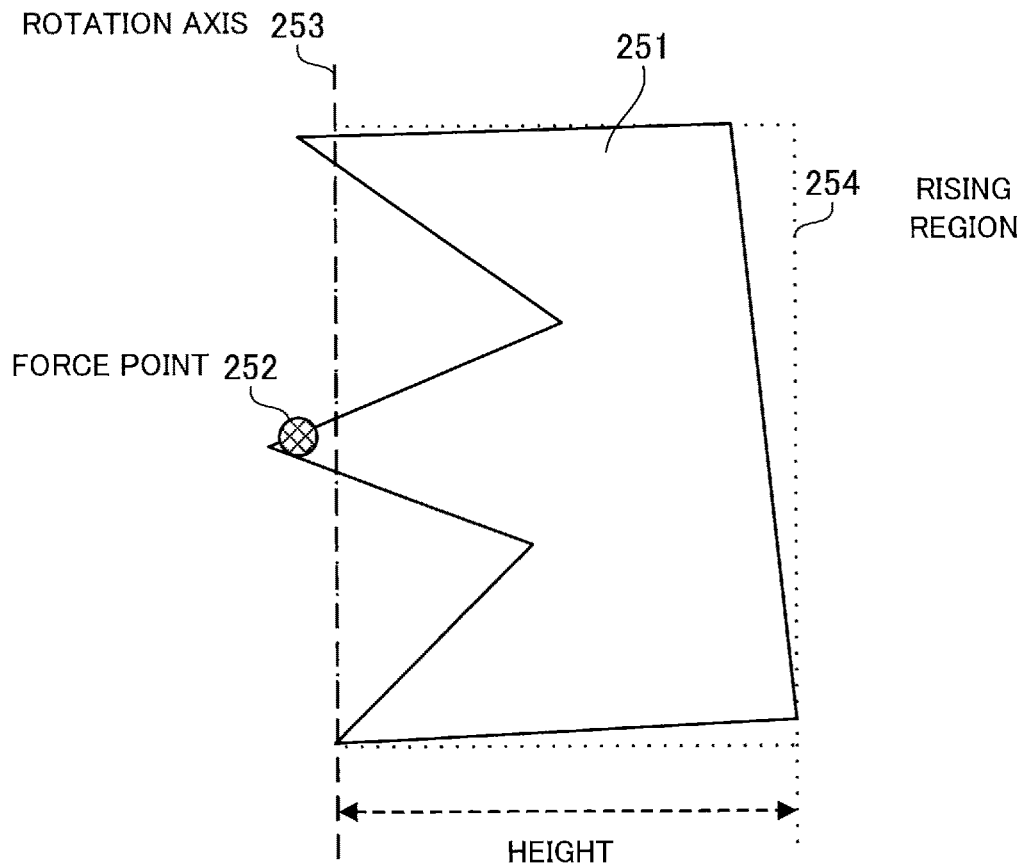
FIG. 17 is a diagram showing a concrete example of a height determination process in the first embodiment.

FIG. 17 is a diagram showing a concrete example of a height determination process in the first embodiment. FIG. 17 shows a cutout region 251, a force point 252 and a rotation axis 253.

The height determination unit 170 determines a region situated on a side opposite to the position of the force point 252 with reference to the rotation axis 253 as a rising region. The rising region is a rectangular region obtained by cutting the cutout region 251 by the rotation axis 253. FIG. 17 shows a rising region 254.

Further, the height determination unit 170 determines the distance from the rotation axis 253 to a position in the cutout region farthest from the rotation axis 253 as the height to which the component corresponding to the cutout region rises.

As above, the height determination unit 170 determines the height when the component corresponding to the cutout region rises based on the cutout region 251, the force point 252 and the rotation axis 253.

Next, the output unit 180 will be described below. The output unit 180 outputs the result of the judgment by the judgment unit 150. For example, the output unit 180 outputs the result of the judgment to the display. Further, the output unit 180 outputs the result of the judgment as audio, for example. Furthermore, the output unit 180 outputs the result of the judgment to a paper medium, for example. The user can recognize whether the component corresponding to the cutout region will rise or not.

The output unit 180 outputs the height determined by the height determination unit 170. The user can consider whether the head outputting the laser beam will collide with the component or not.

According to the first embodiment, the information processing device 100 makes the rising judgment based on the number of supports supporting the object corresponding to the cutout region in the vicinity of an outer edge of the cutout region among the one or more supports supporting the object corresponding to the cutout region. In other words, the information processing device 100 makes the rising judgment in the whole of the cutout region. Accordingly, the information processing device 100 is capable of increasing the accuracy of the rising judgment.

Further, the information processing device 100 does not make the rising judgment based on the number of all of the supports supporting the component corresponding to the cutout region. Extracting all of the supports increases the processing load on the information processing device 100. The information processing device 100 extracts supports supporting the component corresponding to the cutout region in the vicinity of the outer edge of the cutout region. Therefore, the information processing device 100 is capable of reducing the processing load on the information processing device 100.

Furthermore, the information processing device 100 does not regard only the center of the range in which the gas scatters as the place to which the impulsive force is applied. Thus, even when the cutout region is deviated from, the center, the information processing device 100 is capable of incorporating the impulsive force due to the gas spout applied to the cutout region into the rising judgment. Therefore, the information processing device 100 is capable of increasing the accuracy of the rising judgment.

Second Embodiment

Next, a second embodiment will be described below in the second embodiment, the description will be given mainly of differences from the first embodiment and items common to the first embodiment will be left out. FIG. 1 to FIG. 17 will be referred to in the second embodiment.

Figure 18:
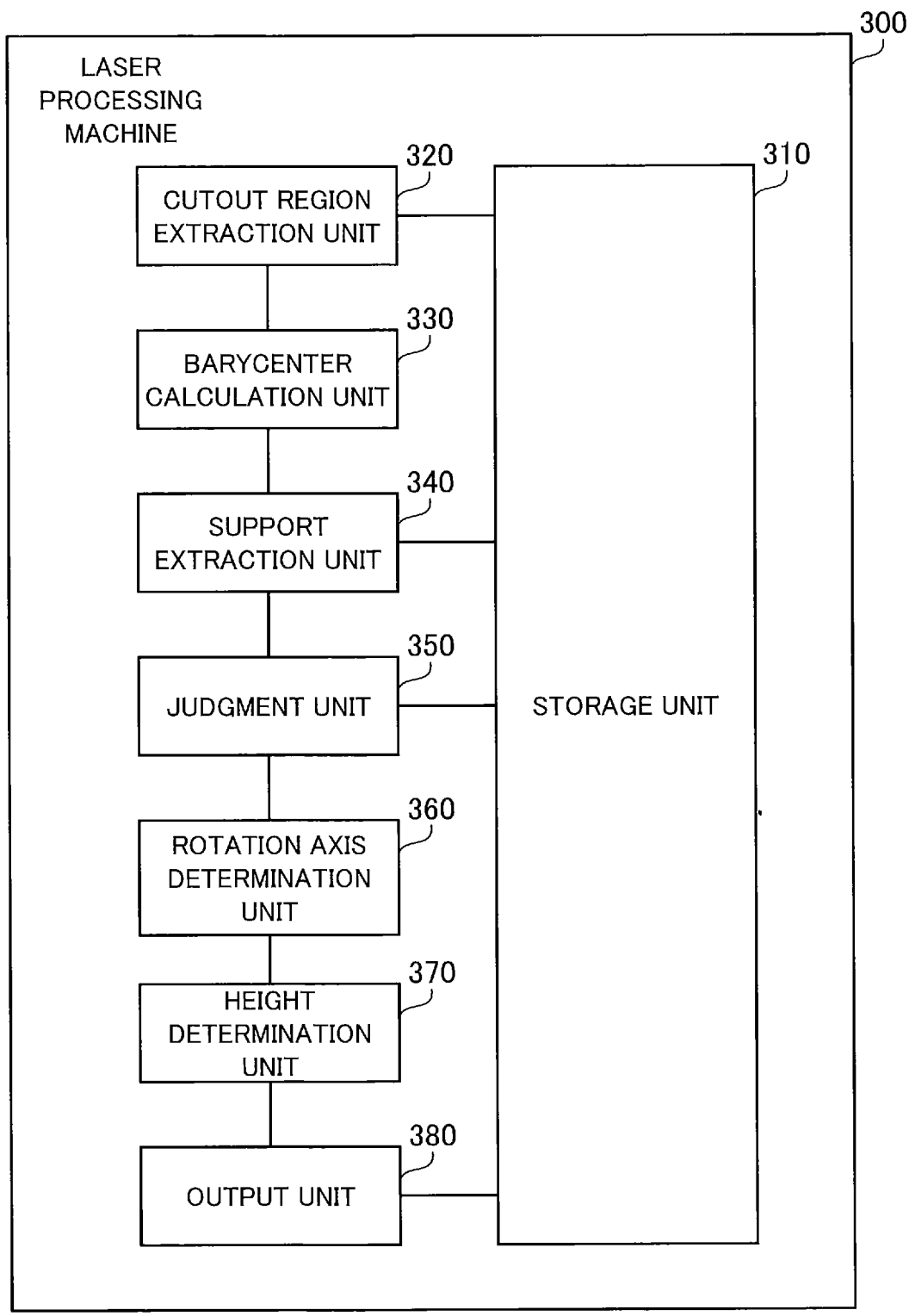
FIG. 18 is a functional block diagram showing a configuration of a laser processing machine in a second embodiment.

FIG. 18 is a functional block diagram showing the configuration of a laser processing machine in the second embodiment. The laser processing machine 300 includes a storage unit 310, a cutout region extraction unit 320, a barycenter calculation unit 330, a support extraction unit 340, a judgment unit 350, a rotation axis determination unit 360, a height determination unit 370 and an output unit 380.

The storage unit 310 may be implemented as a storage area secured in a volatile storage device or a nonvolatile storage device included in the laser processing machine 300.

Part or all of the cutout region extraction unit 320, the barycenter calculation unit 330, the support extraction unit 340, the judgment unit 350, the rotation axis determination unit 360, the height determination unit 370 and the output unit 380 may be implemented by a processor included in the laser processing machine 300.

Part or all of the cutout region extraction unit 320, the barycenter calculation unit 330, the support extraction unit 340, the judgment unit 350, the rotation axis determination unit 360, the height determination unit 370 and the output unit 380 may be implemented as modules of a program executed by the processor included in the laser processing machine 300. For example, the program executed by the processor included in the laser processing machine 300 is referred to also as a judgment program. The judgment program has been recorded in a record medium, for example.

Processes executed by the cutout region extraction unit 320, the barycenter calculation unit 330, the support extraction unit 340, the judgment unit 350, the rotation axis determination unit 360, the height determination unit 370 and the output unit 380 are the same as the processes executed by the cutout region extraction unit 120, the barycenter calculation unit 130, the support extraction unit 140, the judgment unit 150, the rotation axis determination unit 160, the height determination unit 170 and the output unit 180. Therefore, the description is omitted for the processes executed by the cutout region extraction unit 320, the barycenter calculation unit 330, the support extraction unit 340, the judgment unit 350, the rotation axis determination unit 360, the height determination unit 370 and the output unit 380.

According to the second embodiment, the laser processing machine 300 makes the rising judgment based on the number of supports supporting the object corresponding to the cutout region in the vicinity of the outer edge of the cutout region among the one or more supports supporting the object corresponding to the cutout region in other words, the laser processing machine 300 makes the rising judgment in the whole of the cutout region. Accordingly, the laser processing machine 300 is capable of increasing the accuracy of the rising judgment.

DESCRIPTION OF REFERENCE CHARACTERS 11, 12: graph, 13: node, 14: link, 21, 22, 23, 24: node, 25, 26, 27: intersection point, 28, 29: closed region, 31, 32, 33, 34, 35: node, 41, 42: region, 51, 52, 53, 54, 55, 56, 57, 58: node, 59: intersection point, 61, 62, 63, 64, 65, 66, 67, 68, 69, 70, 71, 72, 73: node, 81, 82, 83: graph, 84, 85: point, 100: information processing device, 101: processor, 102: volatile storage device, 103: nonvolatile storage device, 110: storage unit, 120: cutout region extraction unit, 130: barycenter calculation unit, 140: support extraction unit, 150: judgment unit, 160: rotation axis determination unit, 170: height determination unit, 180: output unit, 201: support, 202: axis, 203: support, 204: axis, 205: support, 206: support, 211, 212, 213, 214, 215, 216: support, 217: region, 221: range, 222: center, 223: processing locus, 224: region, 225: point, 231: center, 232, 233: region, 241, 242, 243: support, 244, 245: line, 246: force point, 247: bisector, 251: cutout region, 252: force point, 253: rotation axis, 254: rising region, 300: laser processing machine, 310: storage unit, 320: cutout region extraction unit, 330: barycenter calculation unit, 340: support extraction unit, 350: judgment unit, 360: rotation axis determination unit, 370: height determination unit, 380: output unit.

What is claimed is:

1. An information processing device comprising:
a processor to execute a program; and
a memory to store the program which, when executed by the processor, performs processes of,
extracting a support supporting an object corresponding to a cutout region at an outermost position among one or more supports supporting the object based on cutout region information indicating the cutout region as a region to be cut out by a laser processing machine and support information indicating the one or more supports supporting the object corresponding to the cutout region;
judging whether the object will incline and rise by being supported by the one or more supports or not based on a support count as the number of supports supporting the object at outermost positions;
executing a cutout process on the cutout region; and
outputting a result of the judgment by a visual or audio output.

2. The information processing device according to claim 1, wherein
the program which, when executed by the processor, performs processes of,
calculating an intersection point where a first line connecting first coordinates indicated by processing information as information regarding processing of the object and second coordinates indicated by the processing information and a second line calculated before the first line intersect with each other; and
extracting a closed region based on a plurality of sets of coordinates including the first coordinates and the intersection point as the cutout region.

3. The information processing device according to claim 1, wherein
the one or more supports supporting the object are represented by two-dimensional coordinates based on a first axis and a second axis, and
the support count is a sum total of the number of supports corresponding to a maximum coordinate value in regard to the first axis among the supports supporting the object at the outermost positions, the number of supports corresponding to a minimum coordinate value in regard to the first axis among the supports supporting the object at the outermost positions, the number of supports corresponding to a maximum coordinate value in regard to the second axis among the supports supporting the object at the outermost positions, and the number of supports corresponding to a minimum coordinate value in regard to the second axis among the supports supporting the object at the outermost positions.

4. The information processing device according to claim 1, wherein when the support count is 1 or less, the program which, when executed by the processor, performs a process of judging that the object will not incline and rise by being supported by the one or more supports.

5. The information processing device according to claim 1, wherein when the support count is 2, the program which, when executed by the processor, performs a process of judging that the object will incline and rise by being supported by the one or more supports.

6. The information processing device according to claim 3, wherein when the support count is 3 or more and a barycenter of the cutout region is situated outside a first region based on the supports corresponding to the maximum coordinate value in regard to the first axis, the supports corresponding to the minimum coordinate value in regard to the first axis, the supports corresponding to the maximum coordinate value in regard to the second axis, and the supports corresponding to the minimum coordinate value in regard to the second axis, the program which, when executed by the processor, performs a process of judging that the object will incline and rise by being supported by the one or more supports.

7. The information processing device according to claim 3, wherein
when the support count is 3 or more, a barycenter of the cutout region is situated inside a first region based on the supports corresponding to the maximum coordinate value in regard to the first axis, the supports corresponding to the minimum coordinate value in regard to the first axis, the supports corresponding to the maximum coordinate value in regard to the second axis, and the supports corresponding to the minimum coordinate value in regard to the second axis, and a force point as a central point of a combined moment calculated by using the barycenter and a plurality of impulsive forces as impulsive forces at a plurality of representative points selected from a range where gas spouts out is situated inside the first region, the program which, when executed by the processor, performs a process of judging that the object will not incline and rise by being supported by the one or more supports, and
when the support count is 3 or more, the barycenter is situated inside the first region, and the force point is situated outside the first region, the program which, when executed by the processor, performs a process of judging that the object will incline and rise by being supported by the one or more supports.

8. The information processing device according to claim 7, wherein
the program which, when executed by the processor, performs processes of,
determining a rotation axis based on a first support closest to the force point, a plurality of second supports situated adjacent to the first support, and the force point when it is judged that the object will incline and rise by being supported by the one or more supports;
determining a height when the object rises based on the cutout region, the force point and the rotation axis; and
outputting the height.

9. A laser processing machine comprising:
a support extracting circuitry to extract a support supporting an object corresponding to a cutout region at an outermost position among one or more supports supporting the object based on cutout region information indicating the cutout region as a region to be cut out by the laser processing machine and support information indicating the one or more supports supporting the object corresponding to the cutout region;
a judging circuitry to judge whether the object will incline and rise by being supported by the one or more supports or not based on a support count as the number of supports supporting the object at outermost positions;
executing a cutout process on the cutout region; and
outputting a result of the judgment by a visual or audio output.

10. A judgment method performed by an information processing device, the judgment method comprising:
extracting a support supporting an object corresponding to a cutout region at an outermost position among one or more supports supporting the object based on cutout region information indicating the cutout region as a region to be cut out by a laser processing machine and support information indicating the one or more supports supporting the object corresponding to the cutout region;
judging whether the object will incline and rise by being supported by the one or more supports or not based on a support count as the number of supports supporting the object at outermost positions;
executing a cutout process on the cutout region; and
outputting a result of the judgment by a visual or audio output.

11. A non-transitory computer-readable recording medium storing a judgment program that causes an information processing device to execute a process of:
extracting a support supporting an object corresponding to a cutout region at an outermost position among one or more supports supporting the object based on cutout region information indicating the cutout region as a region to be cut out by a laser processing machine and support information indicating the one or more supports supporting the object corresponding to the cutout region;
judging whether the object will incline and rise by being supported by the one or more supports or not based on a support count as the number of supports supporting the object at outermost positions;
executing a cutout process on the cutout region; and
outputting a result of the judgment by a visual or audio output.

* * * * *